United States Patent [19]

Nawa et al.

[11] Patent Number: 5,667,184
[45] Date of Patent: Sep. 16, 1997

[54] MOUNTING CONSTRUCTION OF AN ELASTICALLY PRESSING MEMBER HAVING AN ENGAGING PART TO BE FIXED TO A ROD-LIKE MEMBER

[75] Inventors: Ikuichiro Nawa; Masafumi Ishizuki, both of Atsugi, Japan

[73] Assignee: Mitsumi Electric Co., Ltd., Atsugi, Japan

[21] Appl. No.: 425,142

[22] Filed: Apr. 19, 1995

[30] Foreign Application Priority Data

Apr. 20, 1994 [JP] Japan .................. 6-081956

[51] Int. Cl.⁶ .................. A47B 97/00
[52] U.S. Cl. .................. 248/500; 248/56; 248/73; 403/326; 403/375; 411/45
[58] Field of Search .................. 248/56, 73, 500; 411/48, 46, 45; 403/326, 329, 109, 375

[56] References Cited

U.S. PATENT DOCUMENTS

| | | | |
|---|---|---|---|
| 4,419,026 | 12/1983 | Leto | 403/109 X |
| 4,640,211 | 2/1987 | Namur | 403/109 X |
| 4,952,106 | 8/1990 | Kubogochi et al. | 411/48 |
| 5,085,545 | 2/1992 | Takahashi | 411/48 X |
| 5,375,954 | 12/1994 | Eguchi | 411/48 |

Primary Examiner—Kenneth J. Dorner
Assistant Examiner—Bruce A. Lev
Attorney, Agent, or Firm—Michael N. Meller

[57] ABSTRACT

There is provided a mounting construction of an elastic member of which one end is fixed to a mounting member fixed to and extending from a first member, the other end of the elastic member being engaged with a second member so that the second member is pressed against the first member, the elastic member having substantially a through hole extending in a pressing direction in which the second member is pressed. A first engaging portion, which is capable of being elastically deformed in a radially outward direction of the through hole, is formed on the one end of the elastic member. A first hook portion, being engaged with the first engaging portion, is formed on an end of the mounting member so that the first hook portion blocks a movement of the first engaging portion in a reverse direction of the pressing direction. The first hook portion may instead be elastically deformed. Additionally, the mounting member may comprise a plurality of circumferentially arranged protrusions capable of being elastically deformed, a center through hole being substantially formed in a center of the protrusions, at least one of the protrusions having a second hook portion protruding in a radially inward direction of the center through hole, a third member having a second engaging portion engaging with the second hook portion inserted into the center through hole so that the third member is mounted to the mounting member.

2 Claims, 7 Drawing Sheets

MOUNTING CONSTRUCTION OF AN ELASTICALLY PRESSING MEMBER HAVING AN ENGAGING PART TO BE FIXED TO A ROD-LIKE MEMBER

BACKGROUND OF THE INVENTION

The present invention generally relates to a mounting construction of an elastic member, and more particularly to a mounting construction of an elastically pressing member which can be rapidly and easily mounted to a rod-like mounting member.

A magnetic recording/reproducing apparatus, such as a digital audio tape recorder, is known in which information is recorded on or reproduced from a magnetic tape by using a magnetic head provided in a rotary cylinder drum. In such a recording/reproducing apparatus, a swing idler is provided for rotating one of a supplying reel table and a winding reel table by selectively engaging with the one of the two reel tables. A reel lock mechanism is also provided for locking the reel tables, when the magnetic recording/reproducing apparatus is in a predetermined state, by engaging with the reel tables.

FIGS. 1 and 2 are cross-sectional views of examples of the swing idler provided in the above-mentioned conventional magnetic recording/reproducing apparatus. In FIGS. 1 and 2, the same parts are given the same reference numerals.

In FIGS. 1 and 2, an arm 3 has a plate-like shape, a fulcrum shaft 4 being mounted on one end of the arm 3 and an idle gear 5 being mounted on the other end. The fulcrum shaft 4 is pivotally mounted on a chassis (not shown in the figures) of the magnetic recording/reproducing apparatus. Accordingly, the arm 3 can swing about the fulcrum shaft 4.

The idle gear 5 selectively engages with one of a supplying reel table and a winding reel table (not shown in the figures) so as to transmit a driving force of a driving motor to rotate the one of the reel tables (hereinafter simply called "the reel table"). In the swing idler 1 shown in FIG. 1, the idle gear 5 is rotatably supported by a caulking pin 6. In the swing idler 2 shown in FIG. 2, the idle gear 5 is rotatably supported by a caulking bushing 7.

A driving gear coupled to an output shaft of the driving motor is engaged with the idle gear 5, and the arm 3 swings in directions corresponding to rotating directions of the driving gear. More specifically, a sliding clutch is formed between contacting parts of the arm 3 and the idle gear 5, and thus the arm 3 rotates about the fulcrum shaft 4 in a direction corresponding to a rotating direction of the driving motor. After the idle gear 5 is engaged with the reel table, which has teeth on its outer periphery gaging with the idle gear 5, the idle gear 5 serves as an intermediate gear between the driving motor and the reel table. That is, the idle gear 5 transmits a driving force of the driving motor to the reel table.

In order to constitute the above-mentioned sliding clutch, the idle gear 5 must be pressed onto the arm 3. To achieve this, an elastic member 8 (hereinafter simply called "spring") such as a tapered coil spring is provided in the swing idlers 1 and 2 so as to press the idle gear 5 onto the arm 3.

In the swing idler 1 shown in FIG. 1, an upper end (an engaging portion) 8a of the spring 8 is engaged with a collar 6a formed on an upper end of the caulking pin 6, and a lower end of the spring 8 is in contact with an upper surface of the idle gear 5. Accordingly, the idle gear 5 is pressed onto the arm 3 by a pressing force generated by the spring 8, and thus the sliding clutch is constituted. It should be noted that the caulking pin 6 is fixed to the arm 3 by caulking a caulking portion 6b formed on a lower end of the caulking pin 6 after inserting the caulking portion 6b into a mounting hole 3a formed in the arm 3.

In the above-mentioned swing idler 1, in order to attach the spring 8, the spring 8 and the idle gear 5 are fit on the caulking pin 6, in that order, before fixing the caulking pin 6 to the arm 3. In this state, the caulking portion 6b of the caulking pin 6 is inserted into the mounting hole 3a of the arm 3, and then the caulking portion 6b which protrudes from a reverse side of the arm 3 is caulked. By the above-mentioned mounting process, the spring 8 is assembled to the swing idler 1.

In the swing idler 2 shown in FIG. 2, the upper end (an engaging portion) 8a of the spring 8 is engaged with a collar 9a formed on a press fitting pin 9 press fit in the caulking bushing 7. The lower end of the spring 8 is in contact with the upper surface of the idle gear 5. The caulking bushing 7 is fixed to the arm 3 by caulking a caulking portion 7a formed on a lower end of the caulking bushing 7 after inserting the caulking portion 7a into the mounting hole 3a formed in the arm 3.

In the above-mentioned swing idler 2, in order to attach the spring 8, the caulking bushing 7 is inserted into the mounting hole 3a of the arm 3 first, and then the caulking portion 7a protruding from the reverse side of the arm 3 is caulked. Accordingly, the caulking bushing 7 is fixed to the arm 3. After that, the idle gear 5 and the spring 8 are fit on the caulking bushing 7, in that order, and then the press fitting pin 9 is press fit in a press fit hole 7b formed in the caulking bushing 7 fixed on the arm 3, and thus the spring 8 is assembled to the swing idler 2.

FIGS. 3 and 4 are cross-sectional views of examples of a reel lock mechanism provided in a conventional recording/reproducing apparatus. In FIGS. 3 and 4, the same parts are given the same reference numerals.

A reel lock mechanism 10 shown in FIG. 3 is provided with a reel lock gear 12 which rotates by being coupled to a driving motor (not shown in the figure). A shaft 12a extends upwardly from the center of the reel lock gear 12. The reel lock gear 12 is rotatably mounted on a support shaft 14 mounted on a chassis of the magnetic recording/reproducing apparatus.

A reel lock 13 is provided on the reel lock gear 12. The reel lock 13 is rotatably supported on the shaft portion 12a formed on the reel lock gear 12. Additionally, a locking claw extending laterally is formed on an outer periphery of the reel lock 13. A reel table (not shown in the figure) is locked by the locking claw 15 being engaged with teeth formed on an outer periphery of the reel table.

A spring 17 is attached on the shaft portion 12a of the reel lock gear 12, and then a cap 16 having a collar 16a is press fit over the shaft portion 12a. The collar 16 is engaged with an upper portion (an engaging portion) of the spring 17. The spring 17 presses the reel lock 13 against the reel lock gear 12 by the upper portion (the engaging portion) of the spring 17 being engaged with the collar 16a. Accordingly, a sliding clutch is constituted between contact portions of the reel lock gear 12 and the reel lock 13.

It should be noted that a slit washer 18 is fit on an upper end of the cap 16. The slit washer 18 engages with an annular groove 14a formed on the upper end of the support shaft 14, and thereby the slit washer 18 is fixed to the support shaft 14. Accordingly, the cap 16 does not come off from the shaft 14 when the cap 16 is pressed upwardly by the spring 17.

A reel lock mechanism 11 shown in FIG. 4 comprises a reel lock gear 19, a reel lock 20 and a spring 21. In the reel lock mechanism 11, the reel lock gear 19 and the reel lock 20 are rotatably mounted on the support shaft 14 mounted on a chassis of the magnetic recording/reproducing apparatus.

In the reel lock mechanism 11, the spring 21 is attached by fitting the spring 21 on the support shaft 14 first. Then a thrust washer 22 engaging with an engaging portion 21a formed on an upper portion of the spring 21 is fit on the support shaft. Thereafter, a slit washer 23 is fit on the support shaft 14. The slit washer 23 is engaged with the annular groove 14a formed on the upper end of the support shaft 14, and thereby the slit washer 23 is fixed on the support shaft 14. Accordingly, the thrust washer 22 does not come off from the shaft 14 when the thrust washer 22 is pressed upwardly by the spring 21.

In the above-mentioned mounting constructions of the springs 8 and 21, there are problems mentioned below.

In the mounting construction of the spring 8 shown in FIG. 1, there is a problem in that an assembling operation is inconvenient because the spring 8 and the idle gear 5 are fit, in turn, on the caulking pin 6, and then the caulking portion 6b of the caulking pin 6 is inserted into the mounting hole 3a of the arm 3 while this state is maintained, and further a caulking operation for the caulking portion 6b must be performed while pressing the caulking pin 6 against an elastic force generated by the spring 8.

In the mounting construction of the spring 8 shown in FIG. 2, there is a problem in that many parts are needed and thus a manufacturing cost is increased although an assembling operation becomes easier than that of the mounting construction shown in FIG. 1 because the caulking bushing 7 is inserted into the mounting hole 3a of the arm 3, and then the caulking portion 7a protruding from the reverse side of the arm 3 is caulked, and thereafter the idle gear 5 and the spring 8 are fit, in turn, on the caulking bushing 7 fixed on the arm 3, and then the press fitting pin 9 is press fit to the caulking bushing 7.

In the mounting construction of the spring 21 shown in FIG. 3, although the reel lock gear 12 and the reel lock 13 are assembled in a single unit before they are mounted on the support shaft 14 which condition is convenient for the assembling operation, there is a problem in that many parts are used and thus a manufacturing cost is increased as is the case for the mounting construction shown in FIG. 2.

In the mounting construction of the spring 21 shown in FIG. 4, there is a problem in that an assembling operation is inconvenient because the thrust washers 22 and the slit washer 23 must be mounted on the support shaft 14 while pressing the spring 21. Additionally, unlike the construction shown in FIG. 3, the reel lock gear 12 and the reel lock 13 are not handled as a single unit, and thus there is a problem in that a measurement of torque, which is generated by a friction between the reel lock gear 12 and the reel lock 13, cannot be performed until the entire reel lock mechanism is assembled.

Further, in each of the mounting constructions of the swing idlers, after the spring 8 is initially mounted, the spring 8 cannot be removed form the swing idlers 1 and 2. Accordingly, if a malfunction occurs in one of the swing idlers, the entire one of the swing idlers must be replaced, and thus there is a problem in that a maintenance cost is high.

SUMMARY OF THE INVENTION

It is a general object of the present invention to provide an improved and useful mounting construction of an elastic member in which mounting method the above-mentioned problems are eliminated.

A more specific object of the present invention is to provide a mounting construction of an elastic member in which mounting construction the elastic member used for pressing a member to another member can be mounted in a simple operation.

Another object of the present invention is to provide a mounting construction of an elastic member in which mounting construction the elastic member can be mounted by a simple operation without increasing a number of parts.

Another object of the present invention is to provide a mounting construction of an elastic member in which mounting construction the elastic member can be easily removed from a mounting member after the elastic member is initially mounted to the mounting member.

In order to achieve the above-mentioned objects, there is provided according to one aspect of the present invention a mounting construction of an elastic member of which one end is fixed to a mounting member fixed to and extending from a first member, the other end of the elastic member being engaged with a second member so that the second member is pressed against the first member, the elastic member having substantially a through hole extending in a pressing direction in which the second member is pressed, the mounting construction comprising:

a first engaging portion, formed on the one end of the elastic member, capable of being elastically deformed in a radially outward direction of the through hole; and a first hook portion, formed on an end of the mounting member, being engaged with the first engaging portion so that the first hook portion blocks a movement of the first engaging portion in a reverse direction of the pressing direction.

Preferably, the elastic member comprises a coil spring, the mounting member comprises substantially a rod-like member, the first engaging portion being formed on an end of the coil spring, the first hook portion having a collar having an outer diameter greater than an inner diameter of the first engaging portion formed on the end of the mounting member.

Additionally, in the mounting construction, the mounting member may comprise a plurality of circumferentially arranged protrusions capable of being elastically deformed, a center through hole being substantially formed in a center of the protrusions, at least one of the protrusions having a second hook portion protruding in a radially inward direction of the center through hole, a third member having a second engaging portion engaging with the second hook portion being inserted into the center through hole so that the third member is mounted to the mounting member.

There is provided according to another aspect of the present invention a mounting construction of an elastic member of which one end is fixed to a mounting member fixed to and extending from a first member, the other end of the elastic member being engaged with a second member so that the second member is pressed against the first member, the elastic member having substantially a through hole extending in a pressing direction in which the second member is pressed, the mounting construction comprising:

a first hook portion, formed on an end of the mounting member, being capable of being elastically deformed in a direction perpendicular to the pressing direction; and a first engaging portion, formed on the one end of the elastic member, being engaged with the first hook portion so that a movement of the first engaging portion in a reverse direction of the pressing direction is blocked.

According to the present invention, the elastic member is attached to the first member or the second member by elastically deforming the first engaging portion or the first hook portion, and thus an assembling operation is easily performed. Since the first engaging portion is formed on the elastic member and the first hook portion is formed on the mounting member, a number of parts is not increased. Additionally, after the elastic member is attached to the mounting member, the elastic member can be removed by elastically deforming the first engaging portion or the first hook portion, and thus a replacement of the elastic member can be easily performed.

Other objects, features and advantages of the present invention will become more apparent from the following detailed description when read in conjunction with the accompanying drawings.

DETAILED DESCRIPTION OF THE PREFERRED EMBODIMENTS

Figure 1:
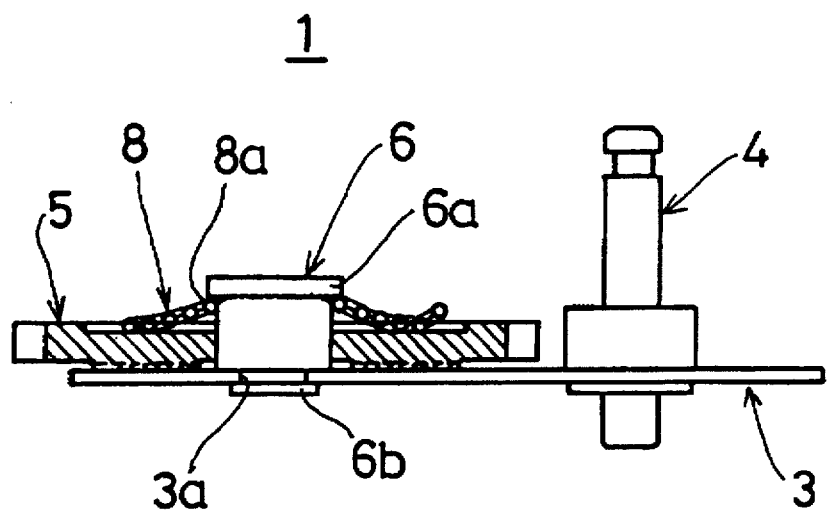
FIG. 1 is a cross-sectional view of an example of a swing idler provided in a conventional magnetic recording/reproducing apparatus.
Figure 2:
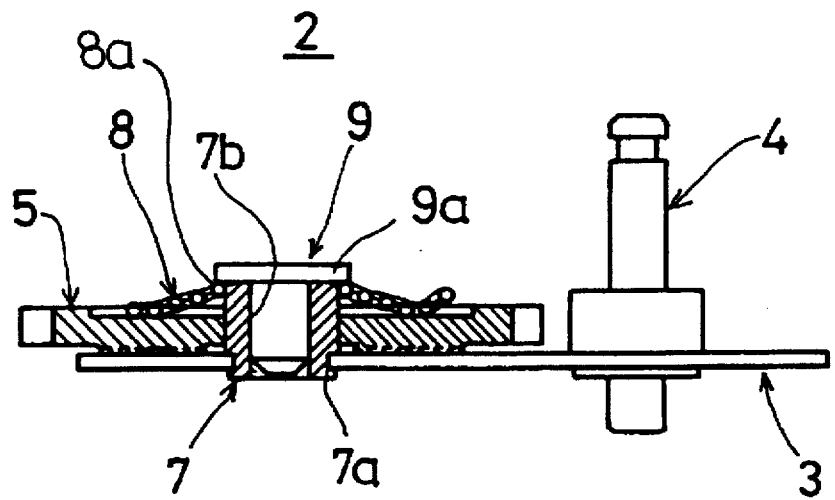
FIG. 2 is a cross-sectional view of another example of the swing idler provided in the conventional magnetic recording/reproducing apparatus.
Figure 3:
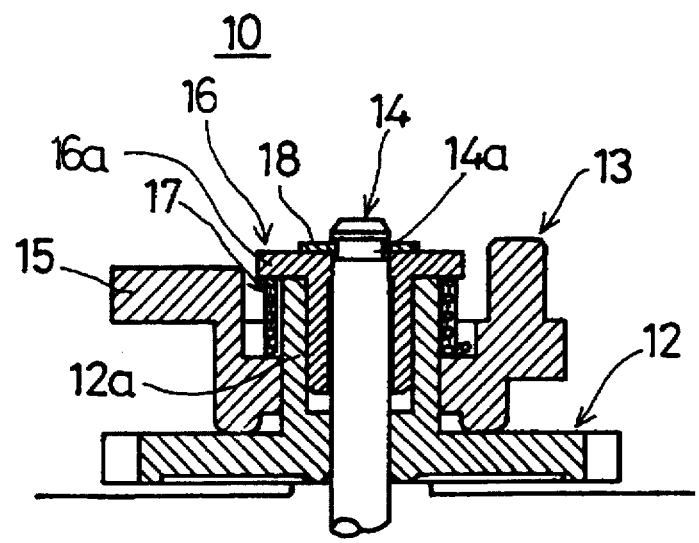
FIG. 3 is a cross-sectional view of an example of a reel lock mechanism provided in the conventional magnetic recording/reproducing apparatus.
Figure 4:
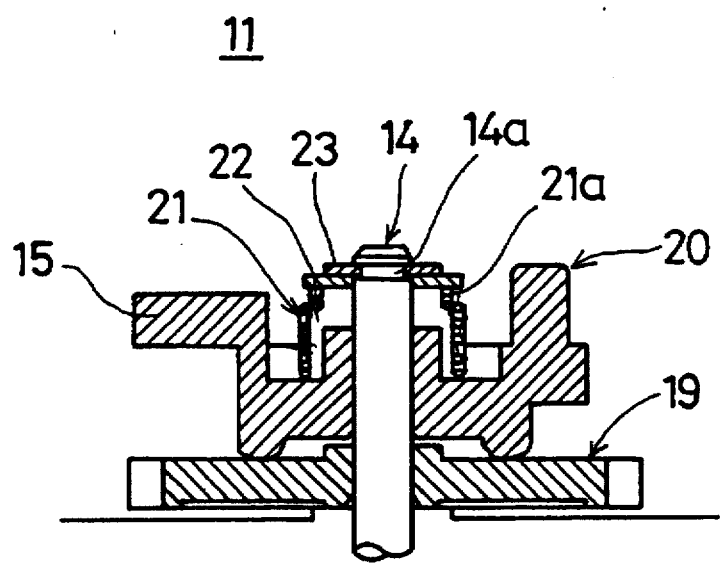
FIG. 4 is a cross-sectional view of another example of the reel lock mechanism provided in the conventional magnetic recording/reproducing apparatus.
Figure 5:
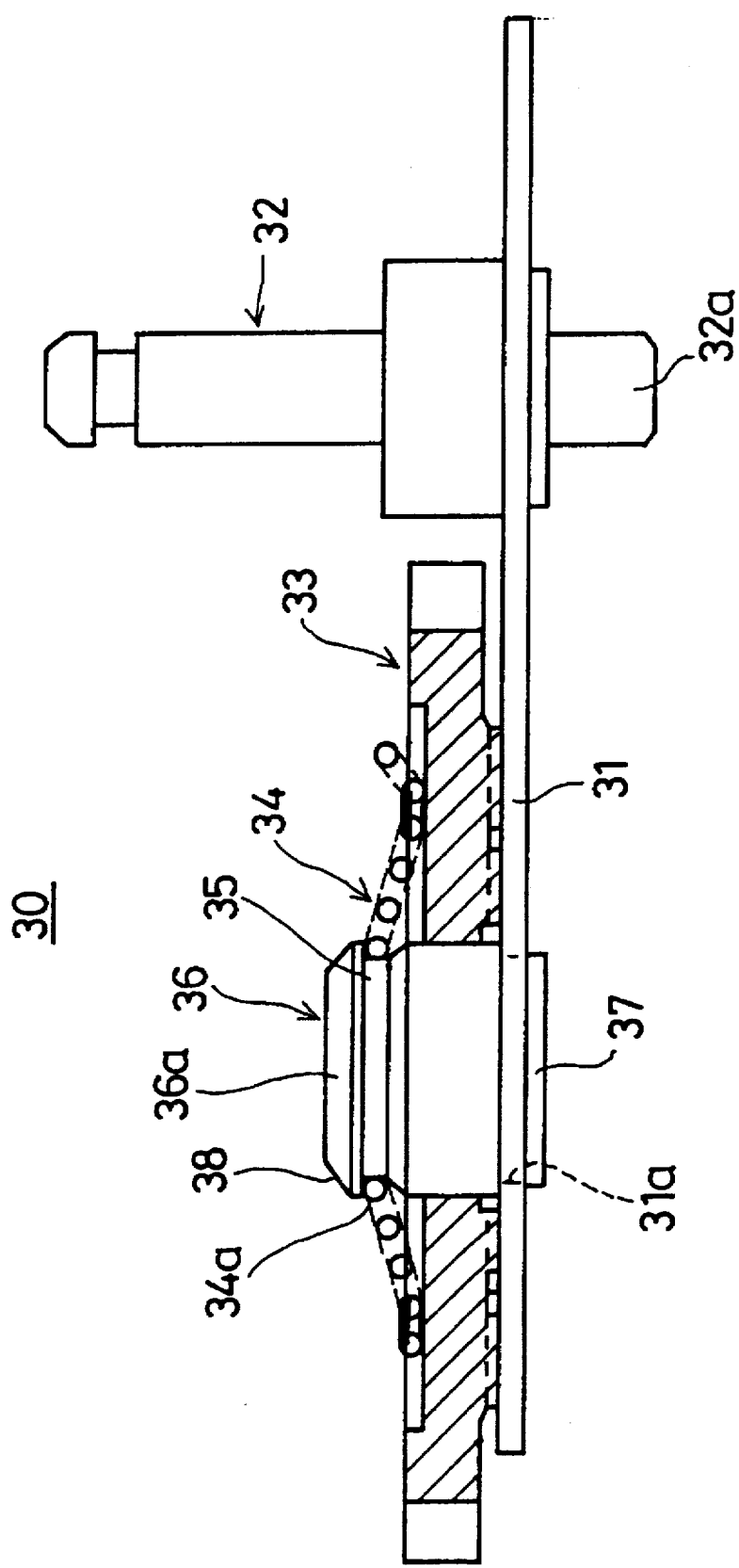
FIG. 5 is a cross-sectional view of a swing idler in which a first embodiment of a mounting construction of an elastic member according to the present invention is applied.

A description will now be given of a first embodiment according to the present invention. FIG. 5 is a cross-sectional view of a swing idler 30 in which a first embodiment of a mounting construction of an elastic member according to the present invention is applied.

In FIG. 5, an arm 31, which is a first member, has a plate-like shape, a fulcrum shaft 32, which is at a rotation center, being mounted on a right end of the arm 31 and an idle gear 33 being mounted on a left end thereof. A lower end 32a of the fulcrum shaft 32 is pivotally mounted on a chassis (not shown in the figure) of a magnetic recording/reproducing apparatus, and thereby the arm 31 can swing about the fulcrum shaft 32.

The idle gear 33, which is a second member, is rotatably supported by a caulking pin 36, which is a mounting member, fixed on the arm 31. The idle gear 33 selectively engages with one of a supplying reel table and a winding reel table (not shown in the figure) so as to transmit a driving force of a driving motor to rotate the one of the reel tables (hereinafter simply called "the reel table"). More specifically, the idle gear 33 is engaged with a driving gear (not shown in the figure) coupled to an output shaft of a driving motor, and thereby the arm 31 can be rotated in a direction corresponding to a rotation of the driving gear.

A sliding clutch mechanism is constituted by interposing, for example, a felt material between opposing portions of the arm 31 and the idle gear 33. The arm 31 rotates about the fulcrum shaft 32 in a direction corresponding to a direction of rotation of the driving motor due to the sliding clutch mechanism. After the idle gear 33 is engaged with teeth formed on an outer periphery of the reel table, the idle gear 33 serves as an intermediate gear between the driving motor and the reel table. That is, the idle gear 33 transmits a driving force of the driving motor to the reel table.

In order to constitute the above-mentioned sliding clutch, the idle gear 33 must be pressed onto the arm 31. To achieve this, an elastic member 34 (hereinafter simply called "spring") such as a tapered coil spring is provided in the swing idler 30 so as to press the idle gear 33 onto the arm 31.

An engaging portion 34a formed on an upper end of the spring 34 is fixed to the caulking pin 36 by being engaged with an annular groove 35 formed on the caulking pin 36. A lower end of the spring 34 is in contact with an upper surface of the idle gear 33. Accordingly, the idle gear 33 is pressed against the arm 31 due to a pressing force generated by the spring 34, and thus the sliding clutch is constituted.

A caulking portion 37 is formed on the lower end of the caulking pin 36, and thus the caulking pin 36 is protrudingly fixed on the arm 31 by caulking the caulking portion 37 after inserting the caulking portion 37 into a mounting hole 31a formed in the arm 31

Figure 6A:
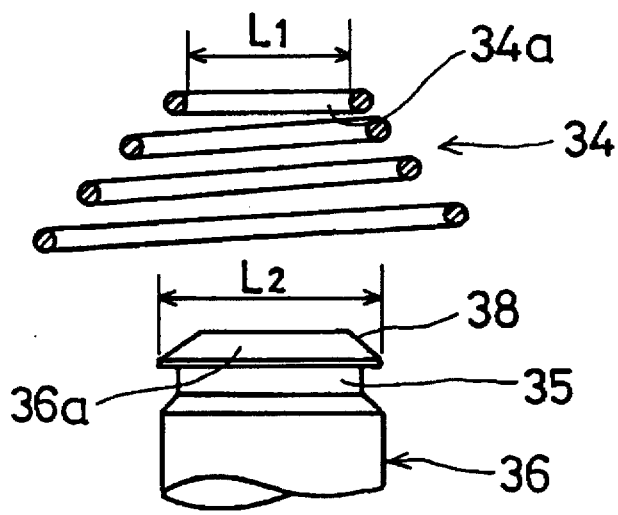
FIGS. 6A to 6C are illustrations for explaining an operation for assembling a spring to a caulking pin shown in FIG. 5.
Figure 6B:
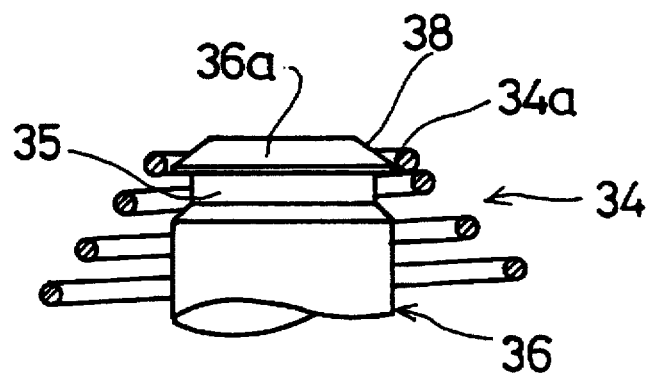
Figure 6C:
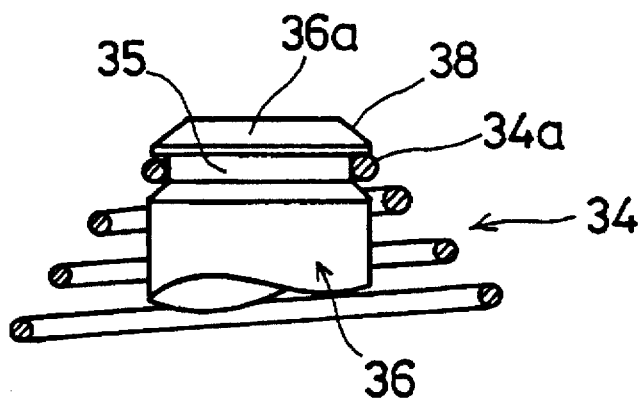

In the above-mentioned swing idler 30, in order to attach the spring 34, the idler gear 33 is fit on the caulking pin 36 and then the spring 34 is fit over the caulking pin 36 while pressing it. FIGS. 6A to 6C show an operation for assembling the spring 34 to the caulking pin 36.

FIG. 6A shows a state immediately before the spring 34 is assembled to the caulking pin 36. As shown in FIG. 6A, an inner diameter L1 of the engaging portion 34a of the spring 34 is smaller than an outer diameter L2 of an upper end 36a of the caulking pin 36 (Li<L2).

FIG. 6B shows a state in which the spring 34 is being assembled to the caulking pin 36. When the spring 34 is moved downwardly from a state shown in FIG. 6A, the engaging portion 34a of the spring pin 34 comes in contact with the upper end 36a of the caulking pin 36. When the spring 34 is farther moved, the engaging portion 34a of the spring 34 is expanded in a radial direction because the inner diameter L1 of the engaging portion 34a is smaller than the outer diameter L2 of the upper end 36a of the caulking portion 36. Since a tapered portion 38 is formed on the upper end 36a of the caulking pin 36, an elastic deformation of the engaging portion 34a can be easily performed.

By moving the spring farther down, the engaging portion 34a slides over the tapered portion 38, and fits into the annular groove 35 and is fixed therein. Accordingly, the spring 34 is attached to the caulking pin 36 as shown in FIG. 6C. Since the engaging portion 34a in the groove 35 returns to a diameter which is smaller than the outer diameter of the caulking pin 36, the engaging portion 34a does not come off from the annular groove 35.

As mentioned above, according to the mounting construction of the spring 34, the spring 34 can be attached to the caulking pin 36 by simply pressing the spring 34 onto the caulking pin 36 from above. Accordingly, the assembling operation of the spring 34 is easy. Additionally, since the engaging portion 34a is a part of the spring 34a and the upper end 36a, which is a hook portion, is a part of the caulking pin 36, a number of parts is not increased.

Further, after the spring 34 is initially attached to the caulking pin 36, the spring can be removed from the caulking pin 36 by elastically expanding the engaging portion so that the inner diameter L1 becomes greater than the outer diameter L2 of the upper portion 36a. Accordingly, a replacement of the spring 34 can be performed easily when maintenance is needed.

It should be noted that, in the above-mentioned embodiment, although the engaging portion 34a, which is a first engaging portion, is elastically deformed, the same advantage can be obtained by a construction in which the outer diameter of the upper portion 36a is elastically deformed so as to be a smaller diameter.

Figure 7:
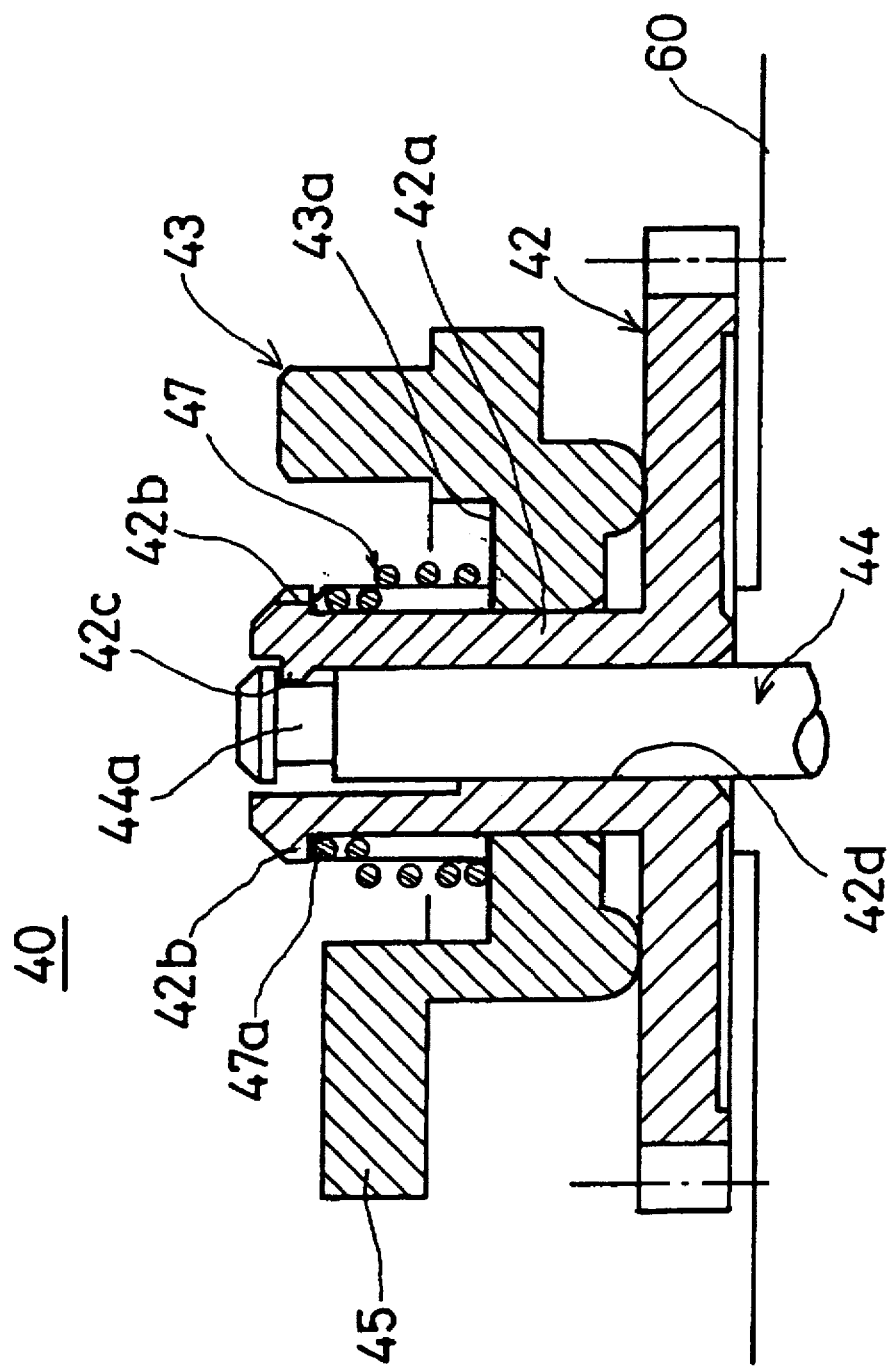
FIG. 7 is a cross-sectional view of a swing idler in which a second embodiment of a mounting construction of an elastic member according to the present invention is applied.
Figure 8A:
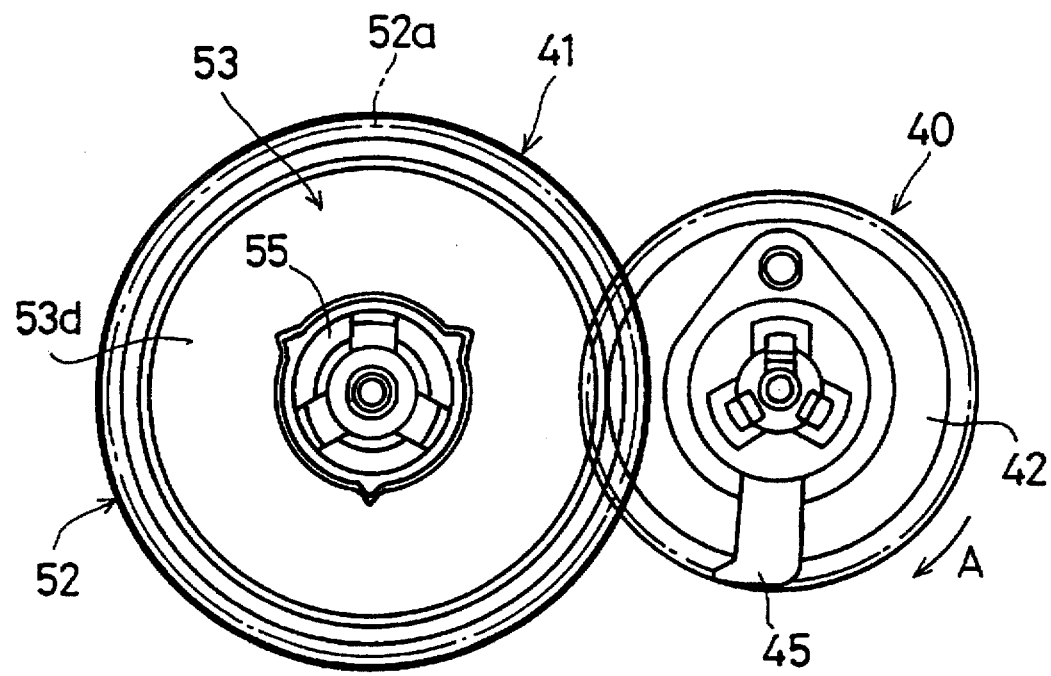
FIGS. 8A and 8B are views of a periphery of a reel in a state in which a reel lock mechanism having the swing idler shown in FIG. 7 is assembled in a magnetic recording/reproducing apparatus.
Figure 8B:
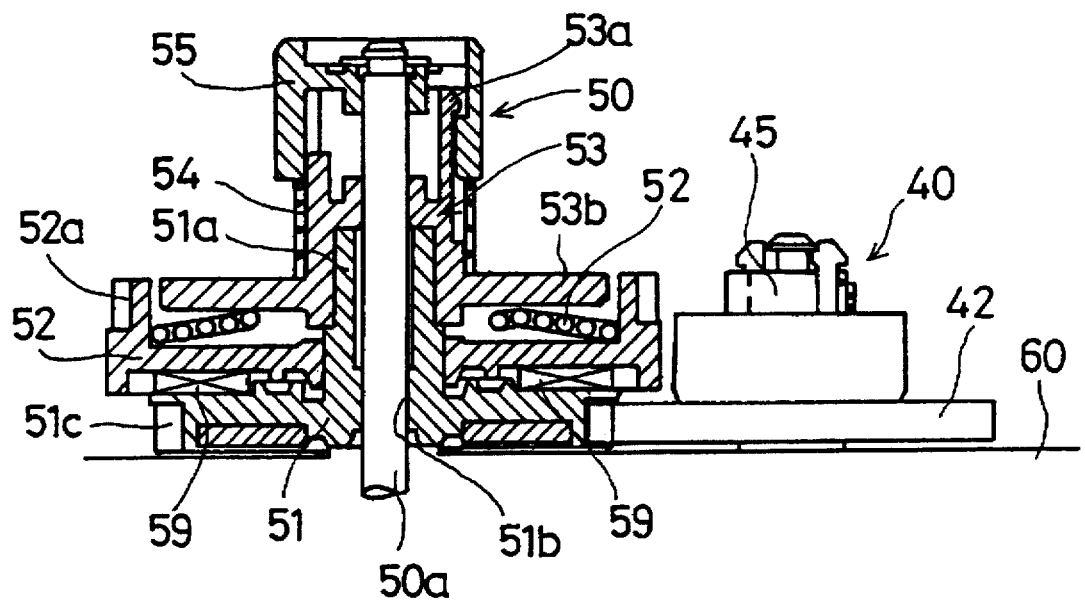

A description will now be given of a second embodiment according to the present invention. FIG. 7 is a cross-sectional view of a reel lock mechanism 40 to which the second embodiment of the mounting construction according to the present invention is applied. FIGS. 8A and 8B are views showing a periphery of a reel in a state in which the reel lock mechanism 40 is assembled in a magnetic recording/reproducing apparatus.

The reel lock mechanism 40 is located near a reel apparatus 50 as shown in FIGS. 8A and 8B. In the figures, the reel apparatus 50 is mounted on a reel shaft 50a protrudingly mounted on a chassis 60. The reel apparatus 50 comprises a real table 51, a clutch member 52, a reel cap 53, a claw spring 54 and a reel claw 55.

The reel table 51 has a disk-like shape, and an upwardly extending column 51a having a through hole 51b is formed on the center thereof. The reel table 51 is mounted on the reel shaft 50a by the reel shaft 50a being inserted into the through hole 51b.

The clutch member 52 is attached on an upper portion of the reel table 51 via a felt material 59. The clutch member 52 also has a disk-like shape, and a gear portion 52a engaging with a reel driving mechanism (not shown in the figures) is formed on an outer periphery thereof. The reel apparatus 50 is rotated by a driving force transmitted through the gear portion 52a.

The reel cap 53 is mounted on an upper portion of the clutch member 52. The reel cap 53 is fixed by being press fit on the column 51a formed on the reel table 51. An engaging arm 53a extending upwardly is formed on an upper portion of the reel cap 53, and a collar 53b is formed on a lower portion thereof. Additionally, a gear portion 51c is formed on an outer periphery of the reel table 51 which gear portion 51c is engaged with the reel lock mechanism 40.

A description will now be given, with reference to FIG. 7, of the reel lock mechanism 40.

The reel lock mechanism 40 comprises a reel lock gear 42 which engages with the gear portion 51c formed on the outer periphery of the reel table 51. An upwardly extending shaft portion 42a (mounting member) is protrudingly formed on the center of the reel lock gear 42. A first hook portion 42b and a second hook portion 42c are formed near an upper end of the shaft portion 42a, the first hook portion 42b protruding outwardly and the second hook portion 42c protruding inwardly. The reel lock gear 42 is rotatably supported on a support shaft 44 (member to be mounted) protrudingly mounted on a chassis 60 of the magnetic recording/reproducing apparatus.

A reel lock 43 is provided on the reel lock gear 42. The reel lock 43 is rotatably supported by the shaft portion 42a formed on the reel lock gear 42. A lock claw 45 is integrally formed with the reel lock 43. An operation of the reel apparatus 50 is locked by the lock claw 45 being engaged with the gear portion 52a formed on the outer periphery of the reel apparatus 50.

A recess is formed on the center of the reel lock 43. A coil spring 47, which is an elastic member, is provided between a bottom surface 43a of the recess and the first hook portion 42b. The reel lock 43 is pressed against the reel lock gear 42 due to an elastic force generated by the spring 47, and thereby a friction force is generated between the reel lock gear 42 and the reel lock 43, and thus a clutch mechanism is constituted between the reel lock gear 42 and the reel lock 43.

Accordingly, when the reel lock gear 42 rotates in a direction indicated by an arrow A in FIG. 8A, the reel lock rotates in the same direction, and thus the lock claw 45 moves toward the gear portion 52a formed on the outer periphery of the reel apparatus 50. The lock claw 45 then engages with the gear portion 52a, and thus the reel apparatus 50 is locked. After the lock claw 45 is engaged with the gear portion 52a, a slide is generated in the above-mentioned clutch mechanism, and thus a rotation of the reel lock 43 is stopped while the reel lock gear 42 is still being rotated.

Figure 9A:
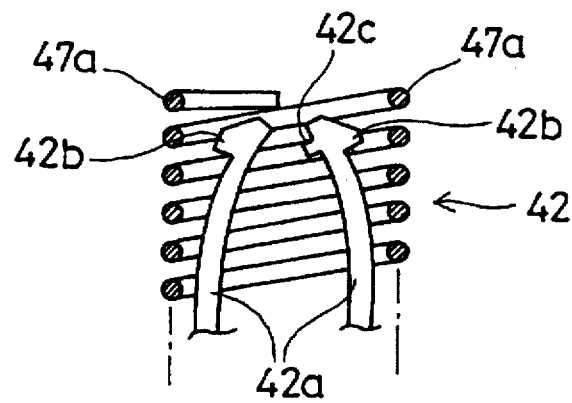
FIGS. 9A and 9B are illustrations for explaining an operation for assembling a spring shown in FIG. 7 to a shaft.
Figure 9B:
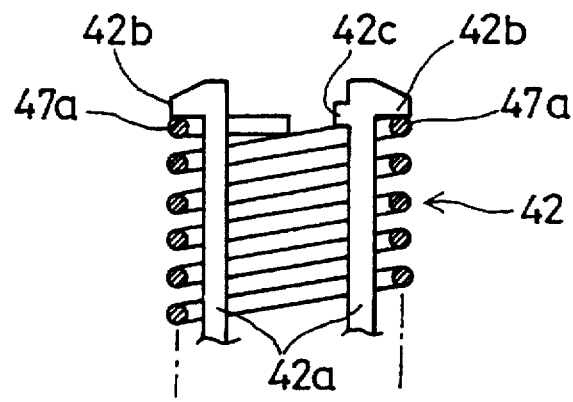

A description will now be given, with reference to FIGS. 7, 9A and 9B, of a mounting method of the spring 47. In order to mount the spring to the shaft portion 42a, the shaft portion 42a is elastically deformed inwardly as shown in FIG. 9A. Due to this operation, the spring 47 can be fit on the shaft portion 42a even if the first hook portion 42b protruding outwardly is formed on an end of the shaft portion 42a. In a state in which the spring 47 is fit on the shaft portion 42a, the first hook portion 42b engages with an engaging portion 47a formed on an upper end of the spring 47, and thus the spring 47 is attached around the shaft portion 42a.

As mentioned above, in the present embodiment, the spring 47 can be attached around the shaft portion 42a by having the first hook portion 42b of the shaft portion 42a being elastically deformed, and thus an assembling operation of the spring 47 can be easily performed. Additionally, after the spring 47 is initially attached to the shaft portion 42a, the spring 47 can be easily removed from the shaft portion 42a by elastically deforming the first hook portion 42b inwardly, and thus a replacement of the spring 47 can be performed easily.

In a state in which the spring 47 is attached to the shaft 42a, the reel lock gear 42 and the reel lock 43 are assembled together, and thus they are handled as a single unit. Accordingly, handling of these parts can be easy when assembling the magnetic recording/reproducing apparatus. Additionally, a measurement of torque generated between the reel lock gear 42 and the reel lock 43 can be easily performed because it is performed in a state in which the reel lock gear 42 and the reel lock 43 are assembled into the unit. This condition can eliminate a defect unit before the unit is assembled into the magnetic recording/reproducing apparatus, and thus a yield rate of the magnetic recording/reproducing apparatus is improved.

A description will now be given of a mounting method of the unit, in which the reel lock gear 42 and the reel lock 43 are assembled to the support shaft 44.

Figure 10:
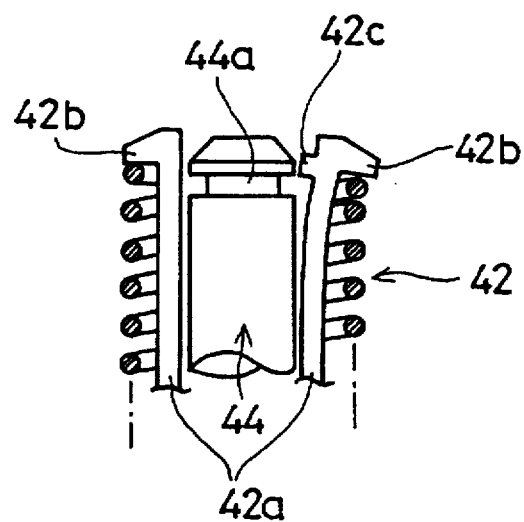
FIG. 10 is an illustration for explaining an operation for assembling a reel lock gear and a reel lock assembly to a support shaft shown in FIG. 7.

In order to mount the unit, in which the reel lock gear 42 and the reel lock 43 are assembled, to the support shaft 44, the support shaft 44 is inserted into a mounting hole 42d formed in the shaft portion 42a. The second hook portion 42c protruding inwardly is formed in the mounting hole 42d. Since the shaft portion 42a elastically deforms outwardly as shown in FIG. 10, the second hook portion 42c does not become an obstacle when the support shaft 44 is inserted into the mounting hole 42d.

An engaging groove 44a, which is a second engaging portion, is formed on an upper end of the support shaft 44. The second hook portion 42c fits in the engaging groove 44a due to an elastic returning force when the above-mentioned unit fits on a predetermined position on the support shaft 44, and thus the unit is fixed to the support shaft 44.

As mentioned above, since a mounting operation of the unit, in which the reel lock gear 42 and the reel lock 43 are assembled, is very simple because the unit is merely fit on the support shaft 44, the mounting operation can be performed easily. Additionally, since the second hook portion 42c is a part of the support shaft 42a and the engaging groove 44a, which is a second engaging portion, is a part of the support shaft, a number of parts is not increased.

The present invention is not limited to the specifically disclosed embodiments, and variations and modifications may be made without departing from the scope of the present invention.

What is claimed is:

1. A mounting construction of an elastic member having a first end and a second end opposite to said first end, said first end being fixed to a mounting member fixed to and extending from a first member, said second end of said elastic member being engaged with a second member so that said second member is pressed against said first member, said elastic member having substantially a through hole extending in a pressing direction in which said second member is pressed, said mounting construction comprising:

a first hook portion, formed on an end of said mounting member, said first hook portion being capable of being elastically deformed in a direction perpendicular to said pressing direction so that said through hole of said elastic member passes through said first hook portion while said first hook portion is elastically deformed in an inward direction; and a first engaging portion, formed on said first end of said elastic member, being engaged with said first hook portion so that a movement of said first engaging portion in a direction reverse to said pressing direction is blocked.

2. A mounting construction of an elastic member having a first end and a second end opposite to said first end, said first end of said elastic member being fixed to a mounting member fixed to and extending from a first member, said second end of said elastic member being engaged with a second member so that said second member is pressed against said first member, said elastic member having substantially a through hole extending in a pressing direction in which said second member is pressed, said mounting construction comprising:

a first engaging portion, formed on said first end of said elastic member, capable of being elastically deformed in a radially outward direction of said through hole; and a first hook portion, formed on an end of said mounting member, being engaged with said first engaging portion so that said first hook portion blocks a movement of said first engaging portion in a direction reverse to said pressing direction, wherein said elastic member comprises a coil spring and said mounting member has substantially a rod shape, said first engaging portion being formed on an end of said coil spring, said first hook portion having a collar having an outer diameter greater than an inner diameter of said first engaging portion formed on said end of said mounting member;

said mounting member comprises a plurality of circumferentially arranged protrusions capable of being elastically deformed, a center through hole being substantially formed in a center of said protrusions, at least one of said protrusions having a second hook portion protruding in a radially inward direction of said center through hole, a third member having a second engaging portion engaging with said second hook portion being inserted into said center through hole so that said third member is mounted to said mounting member;

said third member comprises substantially a rod-like member, and said second engaging portion comprises an annular groove formed on an end of said third member, a taper being formed on said end of said third member; and said coil spring being mounted over said mounting member while said circumferentially arranged protrusions are elastically and inwardly deformed, and said third member is inserted into said center through hole while said circumferentially arranged protrusions are elastically and outwardly deformed.

* * * * *